United States Patent
Frederickson et al.

[15] 3,652,074
[45] Mar. 28, 1972

[54] MOUNTING MEANS FOR ISOLATING VIBRATIONAL ENERGY IN CHAIN SAW MACHINES

[72] Inventors: Robert Eugene Frederickson, South Gate; John Louis Zimmerer, Torrance; Jay Richard Bailey, Woodland Hills, all of Calif.

[73] Assignee: McCulloch Corporation, Los Angeles, Calif.

[22] Filed: June 26, 1970

[21] Appl. No.: 50,164

[52] U.S. Cl. .......................... 267/137, 143/32, 173/162, 267/140
[51] Int. Cl. .......................... F16f 15/08
[58] Field of Search .................... 143/32; 273/162, 139; 16/116 T; 267/141, 140, 139, 136, 137

[56] References Cited

UNITED STATES PATENTS

| | | | |
|---|---|---|---|
| 2,441,766 | 5/1948 | Jardine | 267/137 X |
| 2,831,463 | 4/1958 | Ekström et al. | 267/137 X |
| 3,542,095 | 11/1970 | Frederickson et al. | 143/32 |

Primary Examiner—Donald R. Schran
Attorney—Burns, Doane, Swecker & Mathis

[57] ABSTRACT

An improved resilient mounting means for connecting first and second assemblies of a chain saw machine. The first assembly generates mechanical vibrations and may include an internal combustion engine, a cutting chain with a guide bar and a drive system. The second assembly comprises an inertia mass and may include a fuel tank and a carburetor. The improved resilient mounting means is disposed between the two assemblies and a handle network may be provided to define a cagelike structure connected with the second assembly. The first assembly is resiliently supported within the cagelike network by the mounting means which integrally incorporates both vibrating absorbing and movement limiting features. The mounting means may be arranged to absorb vibration in shear during the normal running of the chain saw and to absorb shock energy generally in compression during brief periods of unusual loading. In one independent feature of the invention, an additional snubber unit may be used in combination with the unitized vibration absorbing and movement limiting mounting means.

6 Claims, 12 Drawing Figures

PATENTED MAR 28 1972

INVENTORS
ROBERT EUGENE FREDERICKSON
JOHN LOUIS ZIMMERER
JAY RICHARD BAILEY

BY Burns, Doane, Benedict,
Swecker & Mathis

ATTORNEYS

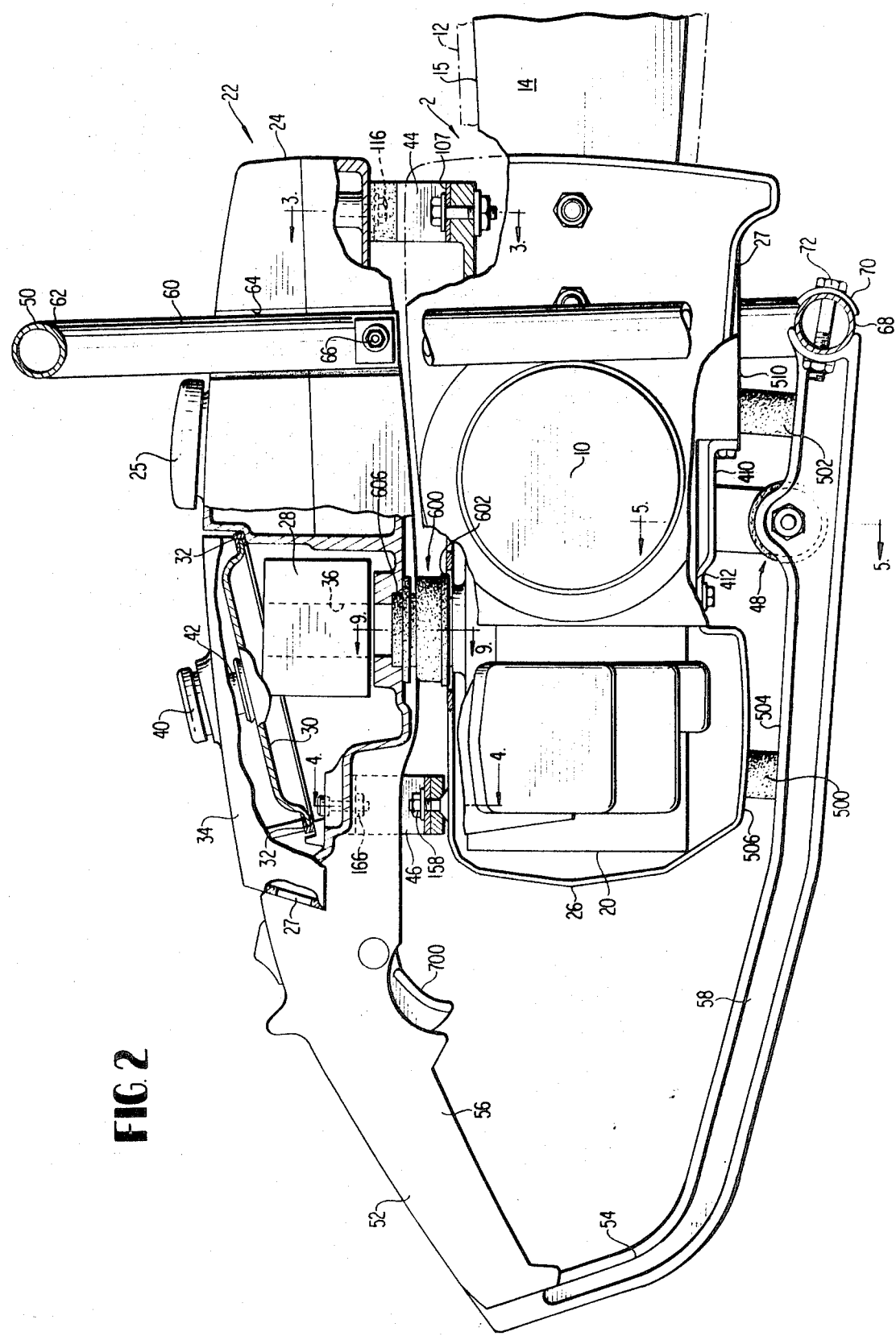

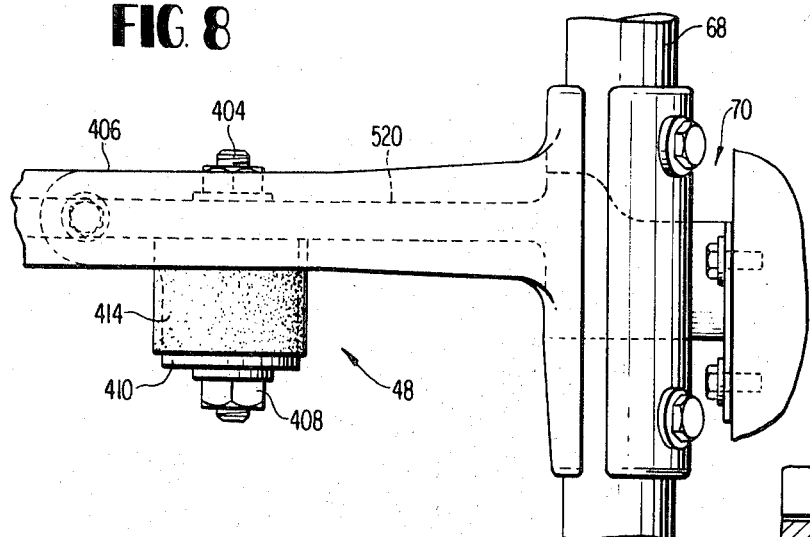
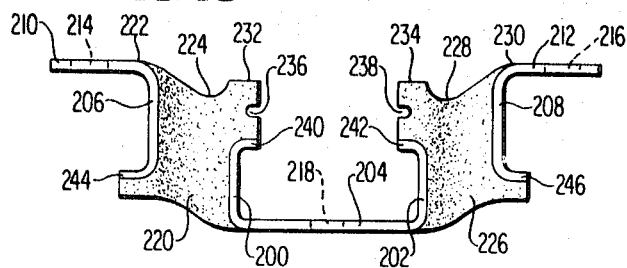
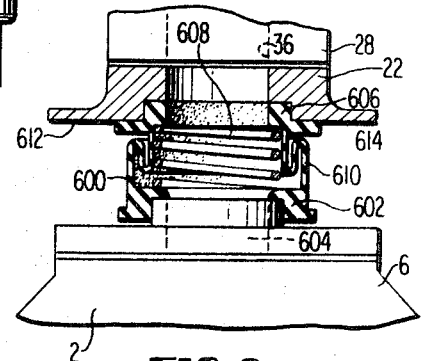
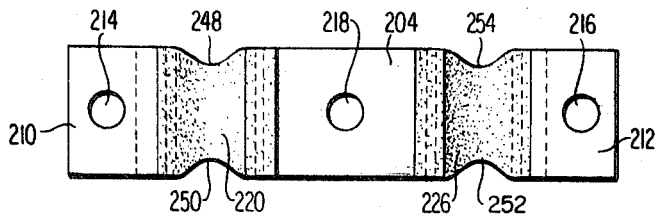
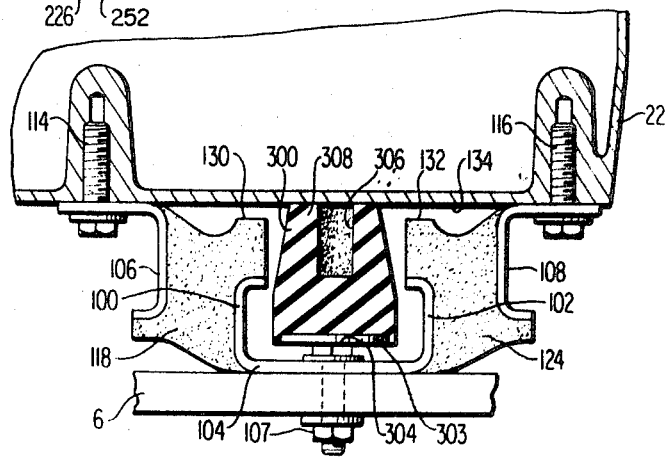

MOUNTING MEANS FOR ISOLATING VIBRATIONAL ENERGY IN CHAIN SAW MACHINES

RELATED APPLICATIONS

This invention relates to an improvement on the subject matter of a U.S. patent application entitled "Vibration Isolation and Bumper System" filed by the inventors of the present invention, assigned to the assignee of the present invention and filed on an even date herewith.

BACKGROUND OF THE PRESENT INVENTION

It has long been recognized that portable chain saws are characterized by a high degree of vibration which tends to cause operator fatigue when a chain saw is used for an extended period of time.

For years, efforts have been expended to reduce the level of vibration transmitted to an operator by portable chain saws. A U.S. Pat. No. 3,372,718 issued to Irgens discloses a system wherein the vibrating components of a chain saw generate vibrations in a plurality of planes. Vibration isolating means are provided by Irgens which means are aligned with only one of these vibration planes and are so arranged as to substantially increase the width or lateral bulk of the portable chain saw. The Irgens arrangement requires a vibration isolation coupling in the drive between an engine and a cutter chain. This requirement produces the disadvantages of structural complexity and reduced efficiency in the application of force from the handle through the chain saw to the cutter chain.

Another attempt to reduce the degree of vibration within a portable chain saw is indicated by a U.S. Pat. No. 3,224,473 issued to Dobbertin et al. The Dobbertin et al. system includes the use of annular, shock absorbing units which operate only in compression so as to necessarily apply substantial distortion forces on an engine assembly during the normal operation of the saw.

A U.S. Pat. application, Ser. No. 750,082 filed by Robert Frederickson et al. on Aug. 5, 1968, and assigned to the assignee of the present invention discloses a very successful vibration isolation system for a portable chain saw. The Frederickson et al. arrangement provides a unique synergistic interaction between an inertia assembly of a chain saw which assembly encircles the vibration generating engine and cutting apparatus and is secured thereto by a cradle arrangement of shock absorber units encircling the center of mass of the vibrating assembly. The cradle arrangement of shock absorber units lies generally in a primary plane of vibration extending transversely of the axis of the crank shaft rotation of the vibrating mass cradled within the inertia assembly to provide a uniquely effective shock absorber action.

U.S. Pat. No. 3,409,056 issued to Rauh shows a chain saw vibration isolation system incorporating a lateral arrangement of vibration isolation units. Frederickson and others found that a vertically planar arrangement of vibration units produced far better results than the lateral arrangement shown by Rauh. Even though the unique arrangement of shock absorbers disclosed in the Frederickson et al. U.S. application, Ser. No. 750,032 provides a significant improvement in vibration absorption for portable chain saws, it has been found that the resilient shock absorbing members used in such a portable chain saw may tend to fail in shear when subjected to unusual strain during wood cutting operations.

Although, it has been generally thought that vibration amplitude limiting surfaces formed integrally with the absorber units would reduce the efficiency of the resilient vibration absorbers, it has unexpectedly been found through the continuing efforts of the assignee corporation that various configurations of integrated vibration absorbing and amplitude limiting devices may be used in a shock absorber system of the type shown in the Frederickson et al. U.S. Pat. application, Ser. No. 750,082 without reducing the damping efficiency thereof and with improved results. These improved integrated devices are operable to limit the degree of available relative movement between the first and second assemblies of chain saws of the type disclosed in the aforementioned Frederickson et al. application and to thereby substantially reduce the tendency of the vibration isolation units to fail in shear. Due to the unique configuration of the devices, a minimum number of the said devices are required for the effective functioning of the overall system.

OBJECTS AND SUMMARY OF THE PRESENT INVENTION

It is therefore an object of the present invention to provide an improvement in vibration isolation systems for chain saws which improvement solves many of the problems which have heretofore been confronting the portable chain saw industry.

It is another object of the present invention to provide an improvement in vibration isolation systems for chain saws which improvement reduces the tendency of resilient elastomeric shock absorber units of portable chain saws to shear when subjected to unusual strain.

It is still another object of the present invention to provide an improvement in chain saw vibration isolation systems wherein integrated resilient mounting members are provided to absorb vibration predominantly in shear during the normal operation of the saw and in compression for only short periods during unusual loading conditions.

It is yet another object of the present invention to provide an improvement in chain saw vibration isolation systems wherein the relative movement between the various assemblies of the chain saw is limited without reducing the vibration absorption capacity provided by the vibration isolating system.

It is a further object of the present invention to provide an integrated vibration absorbing and amplitude limiting member for use in a vibration isolating system wherein a minimal number of the last mentioned members are required.

It is still a further object of the present invention to provide an integrated vibration absorbing and amplitude limiting device which is easy to manufacture.

It is yet a further object of the present invention to provide an integrated vibration absorbing and amplitude limiting device which may be easily installed in existing chain saw machines.

SUMMARY OF THE INVENTION

In accomplishing at least some of these objectives, a mounting means is provided for connecting a vibration assembly with an inertia assembly of a chain saw machine. The mounting means includes elastomeric masses for absorbing vibration in shear during the normal operation of the chain saw. The mounting means further includes elastomeric projections formed integrally therewith for absorbing shock energy in compression during brief periods of unusual loading and for limiting the degree of available relative movement between the first and second assemblies.

In one independent feature of the invention another means is used in combination with the integrated mount to further limit the relative movement between the assemblies.

BRIEF DESCRIPTION OF THE DRAWINGS

While the present invention is particularly pointed out and distinctly claimed in the concluding portion of the specification, a preferred embodiment is shown in the following detailed description which may best be understood when read in connection with the accompanying drawings in which:

FIG. 2 is a side elevation view of the chain saw shown in FIG. 1 partially sectioned to show the members and arrangement of the present invention;

FIG. 8 is a bottom plan view of a portion of the assembly shown in FIG. 5;

FIG. 9 provides a transverse sectional view of the FIG. 2 assembly, as viewed along section line 9—9 of FIG. 2 and illustrates the structural details of flexible conduit defining a passage through which air and fuel may pass from a carburetor to an engine intake port;

FIG. 10 is an elevation view of an alternative embodiment of the integrated mount of the present invention wherein stress relief means are provided;

FIG. 11 is a top plan view of the mount shown in FIG. 10;

FIG. 12 is an elevation view of the mount of FIG. 3 shown in combination with a snubber means.

GENERAL DESCRIPTION OF CHAIN SAW VIBRATION ISOLATION SYSTEM

Figure 1:
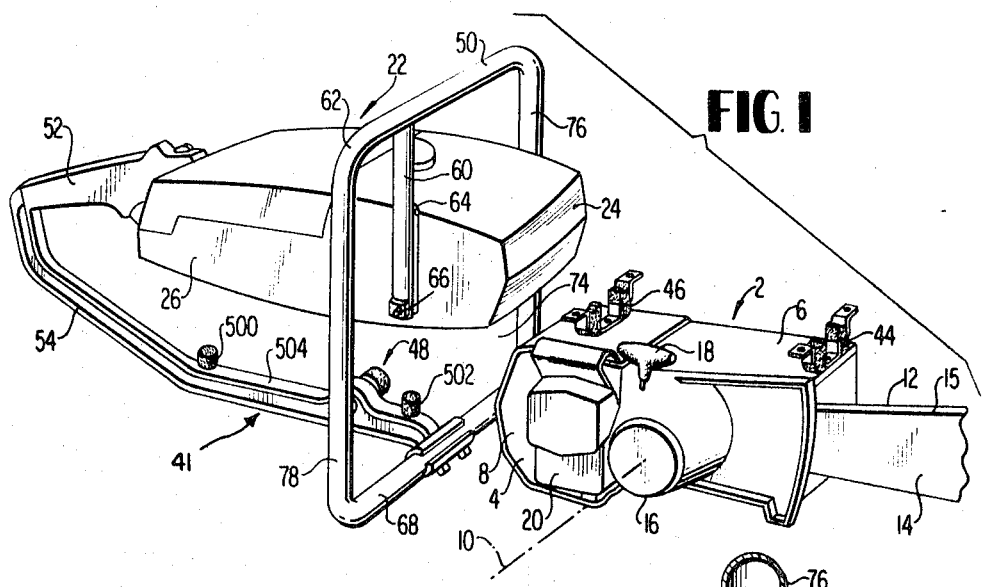
FIG. 1 shows a perspective, exploded view of the basic arrangement of a chain saw, illustrating mutually isolated principal components, integrated vibration absorbing and amplitude limiting mounts, and a cage network defined by interconnecting and mutually inclined handles.

Referring now to the drawings in which like numerals are used to indicate like parts in the various views thereof, FIGS. 1 and 2 show the overall assembly of the chain saw comprising the present invention.

A vibration generating assembly 2 is of a utilized nature and includes an internal combustion engine 4 which may consist of a cast cylinder or engine housing 6 wherein a reciprocating piston (not shown) is operatively mounted. A shroud 8 partially houses the aftermost end of the engine housing 6. The piston may be connected with a crank shaft (also not shown) in a conventional manner so that the crank shaft is provided with an axis of rotation 10. A crank shaft may be connected by a drive chain (not shown) in a conventional manner to a cutting chain 12.

A generally planar and vertically extending guide bar 14 is provided for mounting the cutter chain 12 movably thereon. The cutting chain 12 may be of the conventional type comprising an endless link-type chain mounted in a groove 15 defined in the periphery of and circumscribing the guide bar 14. The cutting chain 12 is thereby operatively mounted to follow a path of travel defined by the peripheral groove formed about the guide bar 14. This travel path is arranged to align with a vertical cutting plane extending longitudinally of the generally vertically extending planar guide bar 14. The drive chain (not shown) may also be of a conventional nature and may be provided for interconnecting the crank shaft with the cutter chain 12. The drive chain may include a centrifugal clutch (not shown) which may be housed within portion 16 of the overall housing of the chain saw. A starter mechanism may be provided for the chain saw and, in the preferred embodiment, comprises a manually operated pull cord and handle mechanism 18. A spark arrestor and sound muffling device 20 may also be incorporated within the chain saw assembly and unitized with the engine 4.

The piston, which supplies the power to drive the chain saw, may be connected with the crank shaft so as to reciprocate along a path extending generally longitudinally and parallel with the previously defined cutting plane and guide bar 14. This path taken by the power piston may also be generally aligned with a longitudinal median plane 11 (see FIG. 6) which extends longitudinally of the overall chain saw and is disposed in general parallel relationship with the cutting plane and guide bar 14.

The internal combustion engine 4, the piston and crank shaft assembly, the clutch housed within portion 16 of the unitized assembly 2, the starter mechanism 18, the guide bar 14, and the cutting chain 12 and drive chain may all be connected in a manner which is well recognized in the chain saw art and shown in detail in FIGS. 1 and 2. An example of such a conventional arrangement is disclosed in a publication entitled, "McCulloch Shop Manual McC 1–10 and McC 2–10" published in 1965 by the McCulloch Corporation of Los Angeles, California.

A second unitized assembly 22 comprises the remaining portion of the overall chain saw and may include a unitary housing defining a fuel tank 24 which is disposed at a forward end thereof adjacent the guide bar 14. A closure cap 25 may be provided on an upper surface of the tank portion 24 to permit access to the interior of the fuel tank through an opening disposed thereunder. An after section 26 of the fuel tank assembly 24 is located generally adjacent and above the engine assembly 6 and houses a conventional carburetor 28 (see FIG. 2). An air filter 30 may be secured above the carburetor 28 on a housing ledge 32 and may be secured in place by a removable cover member 34. The fuel tank 24 is operable to supply fuel to the carburetor 28. The cover member 34 may be provided with air openings 27 to permit air flow for passage through the filter 30 to the upper end of an induction passage 36 of the carburetor 28. The cover 34 may be secured in place by a threaded fitment 40 which may be formed to threadedly engage with a threaded stud 42 which may be mounted on and extend upwardly from the overall carburetor assembly 28.

The general structural arrangement and cooperative interaction of the fuel tank 24, the after section 26, the carburetor 28, the air filter 30, and the removable closure member 34 is described in the aforementioned McCulloch publication.

FIG. 2 of the drawing shows the operational relationship of the first assembly 2 with respect to the second assembly 22 wherein the second assembly 22 is superposed above the first assembly 2 when the guide bar 14 is disposed in a position operable for cutting in a substantially vertical plane. A first vibration isolation means 44 may be interposed between the first and second assemblies generally adjacent the guide bar 14. A second vibration isolation unit 46 may be interposed between the first assembly 2 and the second assembly 22, generally adjacent the cylinder 6 and the carburetor 28. A third vibration isolation unit 48 may be mounted adjacent the underside of the first assembly 2.

A first handle member 50 may be disposed about the entire chain saw to fully encircle the superposed, first and second assemblies in an area generally adjacent to the guide bar 14. The first handle means 50 extends generally transversely of the cutting plane of the guide bar 14 and the cutting chain 12. A second generally U-shaped handle member 52 may be connected with the second assembly 22 and the third vibration isolation unit 48. The handle member 52 may include a generally U-shaped end portion 54 and a pair of vertically extending spaced leg portions 56 and 58. The upper leg portion 56 may be attached to and integrated with a portion of the second assembly 22. The lower leg 58 may be connected with the third vibration unit 48 which, in turn, is connected with the first unitized assembly 2. The handle member 50, at each side thereof, extends generally longitudinally of or parallel to, the longitudinal median plane 11 (shown in FIG. 6) and is preferably aligned therewith.

A generally vertically extending, force transmitting member 60 may be connected with an upper portion 62 of the handle 50 and is operable to transmit a force from the upper portion 62 of the handle 50 to the second unitary assembly 22. The supporting member 60 may be connected to a recessed side portion 64 of the fuel tank portion 24 of the second inertia mass assembly 22. Conventional threaded fastening units 66 may be utilized to effect the connection between the member 60 and the side of the fuel tank 24. A lower portion 68 of the handle member 50 extends beneath the underside 27 of the first unitary assembly 2. The lower portion 68 extends generally transversely of the longitudinal median plane 11 and is connected with the leg 58 of the handle 52 at junction 70 by conventional threaded nut and bolt fastening apparatus 72. By this arrangement, the handle 52 with an extension of leg 56 defined by the second unitary assembly 22, is connected with the upper portion 62 and the lower portion 68 of the overall handle arrangement 50 to define a generally cagelike handle structure.

The cagelike structure is defined by the arrangement comprising the overall handle means 50, extending transversely of the longitudinal median plane 11 and further comprising the second unitary assembly 22 and handle portion 54, extending generally longitudinally of the median plane 11. The vibration isolation units 44 and 46 and 48 are operable to resiliently support the first unitary assembly 2 within this cage structure. The vibration isolation units 44, 46 and 48 may be generally longitudinally aligned with the longitudinal median plane 11. While the vibration isolation unit, as shown in FIG. 8, may be slightly displaced from this median plane, and while unit 44 may be slightly off center, it will be recognized that a common plane passing substantially adjacent or contiguous with the plane 11 will intersect each of the units 44, 46 and 48. In this manner, the vibration isolation units 44, 46 and 48 define a generally triangular resilient support network cradling the assembly 2 within the cagelike structure 41.

Preferably, the units 44, 46 and 48 may be arranged in a plane in a more or less equilateral triangular configuration, generally symmetrically arranged with respect to and surrounding the center of mass of the first unitary assembly 2. This center of mass will be more or less adjacent the axis of rotation 10 in many commercial chain saw embodiments. Thus, the vibration isolation units 44, 46 and 48 are, in some embodiments, disposed more or less radially equidistant from the center mass of the vibration generating assembly 2. It will be noted that the unitary vibrating assembly 2 is supported within the cage framework so as to be disposed within an opening 74 defined by the handle arrangement 50. The opening 74, itself, extends generally in alignment with the longitudinally extending plane 11. The unitized assembly 2, disposed within the opening 74, may be supported between the leg extension defining assembly 22 and the leg 58. In this configuration, the handle arrangement 50 serves to provide a force transmitting connection between the leg defining assembly 22 and the leg segment 52. The force transmission is facilitated by the horizontally displaced, side portions 76 and 78 of the overall handle arrangement 50 which side portions are disposed laterally outwardly of the superposed assemblies 22 and 2.

With this arrangement of components, the vibration isolating units 44, 46 and 48 are effective to absorb vibration energy in a multiplicity of directions, generally aligned with the principal vibration plane which extends generally parallel with the longitudinal median plane 11.

STRUCTURAL DETAILS OF IMPROVED VIBRATION ISOLATION MOUNTS HAVING AN INTEGRATED BUMPER FEATURE ACCORDING TO THE PREFERRED EMBODIMENT

Figure 6:
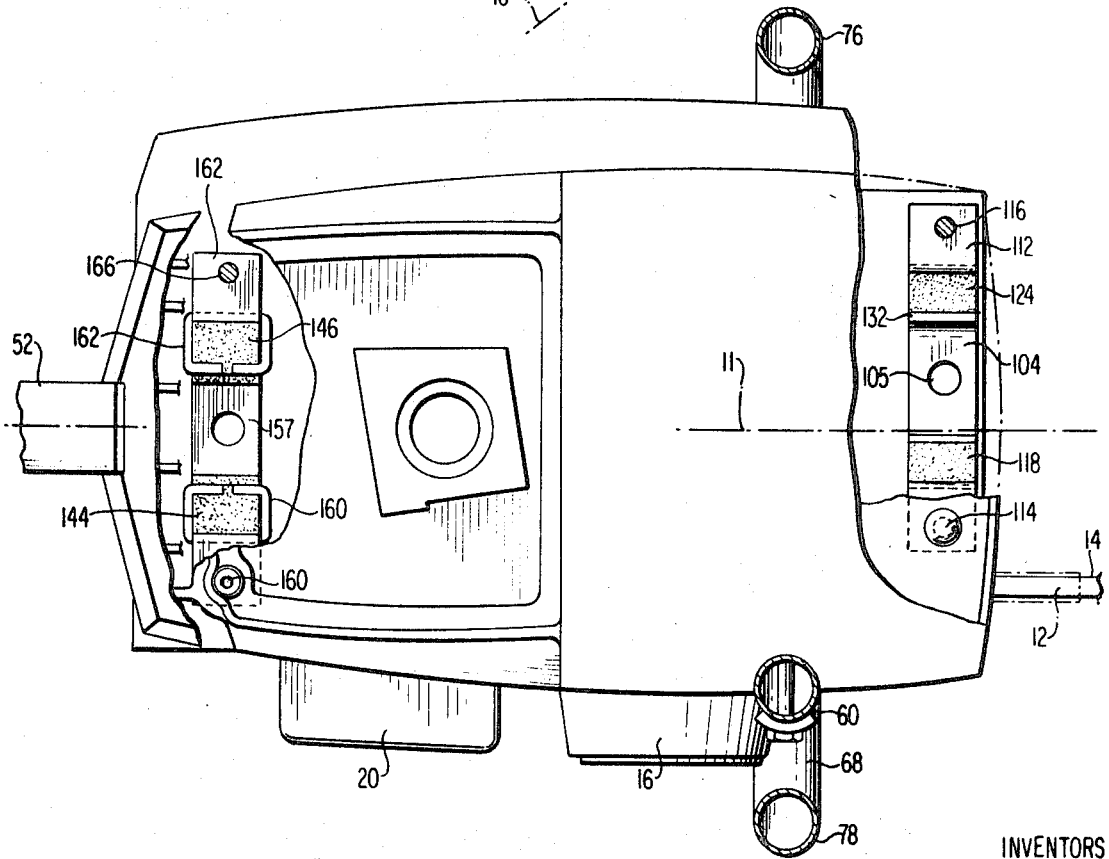
FIG. 6 is a top plan, partially fragmentary, view of the FIG. 2 assembly, illustrating the structural details of the shock absorbing and amplitude limiting mounts shown in cross section in FIGS. 3 and 4.
Figure 3:
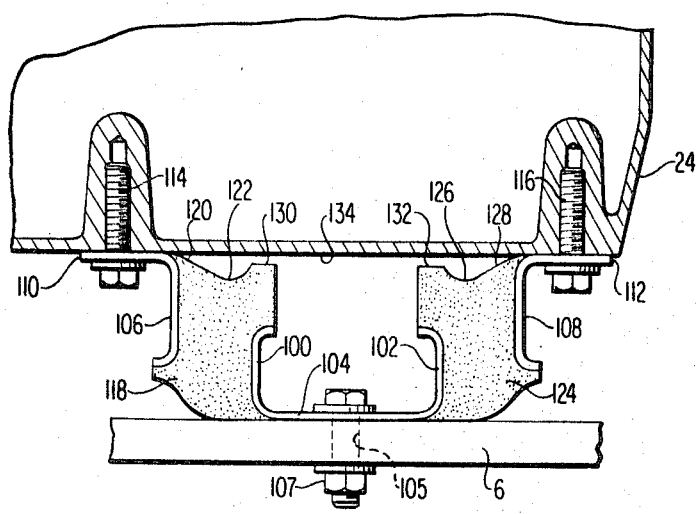
FIG. 3 is a transverse sectional view of the chain saw shown in FIGS. 1 and 2 illustrating the structural details of one embodiment of a vibration absorbing and amplitude limiting mount according to the present invention disposed generally adjacent a guide bar of the chain saw as viewed along the section line 3—3 of FIG. 2.

The structural details of the first shock absorbing unit 44 having an integrated bumper feature are best shown in FIGS. 3 and 6.

The integrated vibration isolation and bumper apparatus of FIG. 3 generally comprises a pair of spaced walls 100 and 102 which extend in planes parallel with each other and which are connected by a force transmitting web portion 104. Walls 106 and 108 are laterally outwardly spaced from walls 100 and 102, respectively, and are arranged parallel therewith. Upper flanges portions 110 and 112 may be provided on the walls 106 and 108, respectively, and may extend outwardly therefrom. The outward extensions 110 and 112 may be formed for the insertion of threaded fastening means 114 and 116 for mounting the integrated bumper and vibration isolation units with an operable chain saw machine. The web 104 may be provided with a hole 105 for the insertion of fastening means 107.

The spaced, parallel extending walls 100 and 106 are connected by means of an elastomeric mass 118. The mass is sized to extend below the lower edge of the wall 106 and to extend above the upper edge of the wall 100. An upper surface 120 of the elastomeric mass 118 is formed with a generally cylindrical cutout 122 so as to increase the flexibility and resiliency of the mass 118 in that area. Due to the softening feature provided by the cutout 122, the vibration absorption capability of the elastomeric mass 118 is not inhibited when the mass is subjected to compressive shock loading during unusual operating conditions.

The spaced walls 102 and 108 are similarly connected by an elastomeric mass 124. The elastomeric mass 124 is generally a mirror image of the mass 118 and is similarly formed with a generally cylindrical cutout 126 in an upper surface 128 thereof.

It will be noted, that due to the arrangement of the cylindrical cutouts 122 and 126, that upwardly projecting bumper-like protuberances 130 and 132 are provided. These protuberances 130 and 132 operate to absorb shock energy in compression during periods of unusual loading while the elastomeric masses 118 and 124 absorb vibrational energy in shear during normal loading.

The unitized nature of the integrated bumper and vibration isolation units shown in FIG. 3 has proven to be especially advantageous for its relative simplicity and ease of manufacture. The upward extension of the protuberances 130 and 132 may be designed to provide a clearance between the upper surfaces thereof and an immediately adjacent surface 134 so that the protuberances will not engage the surface unless the masses 118 and 124 are subjected to unusual stress.

Figure 4:
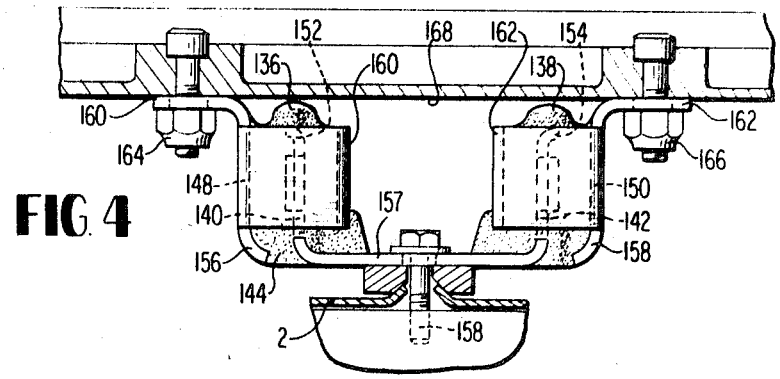
FIG. 4 is a transverse sectional view of the chain saw shown in FIGS. 1, 2 and 3 viewed along a section line 4—4 of FIG. 2 and illustrating the structural detail of a second embodiment of a vibration absorbing and amplitude limiting mount according to the present invention disposed generally adjacent a carburetor housing of a chain saw.

FIG. 4 shows an alternative to the integrated vibration isolation and bumper unit of FIG. 3 installed as the upper rear mount 46 of the saw. Protuberances 136 and 138 of the mount shown in FIG. 4 are operable to limit relative movement between the two principal assemblies 2 and 22 of the chain saw of the present invention in at least two directions.

Figure 7:
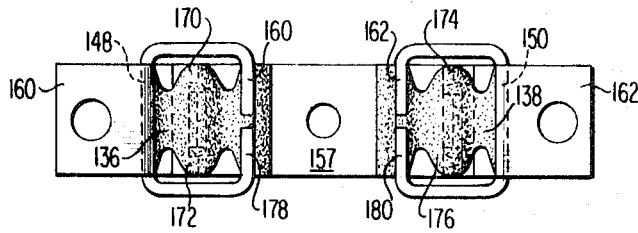
FIG. 7 is a top plan view of the integrated mount shown in FIG. 4.

It will be noted from a perusal of FIGS. 4 and 7 that the generally parallel extending walls 140 and 142 of the embodiment shown therein are embedded within respective elastomeric masses 144 and 146. Laterally outwardly spaced and parallel extending walls 148 and 150 are also provided in a manner similar to the outer walls 106 and 108 of the embodiment shown in FIG. 3. Upper portions 152 and 154 of the parallel extending walls 140 and 142, respectively, are formed to curve upwardly and slightly outwardly. Lower portions 156 and 158 of the outer walls 148 and 150, respectively, are formed to extend downwardly and inwardly along a curve substantially similar to the curve defined by the upward and outward extension of the upper portions 152 and 154 of the inner walls 140 and 142, respectively. Metallic shroudlike members 160 and 162 may be rigidly secured to the outer walls 148 and 150, respectively, and may be operable to limit the movement of the elastomeric masses 144 and 146 in a direction parallel to the walls 140, 142, 148 and 150 and longitudinally of the chain saw machine of FIGS. 1 and 2. Looking at FIG. 7, it can be seen that the sides of the projections 136 and 138 which are rounded about the upper surface thereof, may also be formed so as to present a rounded projection-like surface extending in the aforementioned direction parallel to the walls 140, 142, 148 and 150 and extending longitudinally of the assembled chain saw machine.

Thus, movement between a first vibration generating assembly 2 connected by fastener 158 with a force transmitting web 157 extending between the walls 140 and 142, and a second inertial mass assembly 22, connected with flange portions 160 and 162 of the outer walls 148 and 150 by fasteners 164 and 166, respectively, may be limited in the upward direction by means of the upwardly extending protuberances 136 and 138 bumping against a lower surface 168 of the second assembly 22 extending over the protuberances 136 and 138. Similarly, movement in a horizontal direction and in a plane parallel to the wall 140, 142, 148 and 150 may be limited by the bumping action of the elastomeric masses 118 and 124 and in particular by horizontally extending protuberances 170, 172, 174 and 176 (see FIG. 7) against the metallic shrouds 160 and 162 which are rigidly connected with the outer walls 148 and 150. Movement between the assemblies 2 and 22, which would change the spacing between the parallel walls 140 and 142 and 148 and 150 may be limited by the walls 178 and 180 of the metallic shrouds 160 and 162. Movement in the downward direction may be limited by the compression effect on the masses 144 and 146 by the outwardly extending upper curved portions 152 and 154 of the walls 140 and 142 embedded within the elastomeric masses 144 and 146, respectively, and the lower inwardly curving portions 156 and 158 of the outer walls 148 and 150, respectively. Due to the nearly overlapping arrangement of the curved portions 152 with 156 and of 154 with 158 and the placement of elastomeric masses 144 and 146 therebetween, the downward movement of the web 157, attached with the vibration assembly 2, may be vertically limited in a shock absorbing manner as assemblies 2 and 22 are moved apart.

Therefore, the embodiment of FIGS. 4 and 7 provides an integrated vibration isolation and bumper unit wherein the movement of assemblies connected thereby may be universally limited without impeding the vibration absorbing quality of the elastomeric masses 144 and 146 incorporated therein.

FIGS. 10 and 11 show an alternative to the embodiment of FIG. 3 wherein an integrated vibration isolation and bumper unit is provided with a stress relief feature.

The integrated apparatus of FIGS. 10 and 11 generally comprises a pair of spaced walls 200 and 202 which extend in planes parallel with each other and which are connected by a force transmitting web portion 204. Walls 206 and 208 are laterally outwardly spaced from walls 200 and 202, respectively, and are arranged parallel therewith. Upper portions 210 and 212 may be provided on the walls 206 and 208, respectively, and may extend outwardly therefrom. The outward extensions 210 and 212 may be formed with holes 214 and 216 for the insertion of threaded fastening means (not shown) for mounting the integrated bumper and vibration isolation unit within an operable chain saw machine. The web portion 204 may also be formed with a hole 218 for installing the unit within a chain saw.

The spaced, parallel extending walls 200 and 206 are connected by means of an elastomeric mass 220. The mass is sized to extend below the lower edge of the wall 206 and to extend above the upper edge of the wall 200. An upper surface 222 of the elastomeric mass 220 is formed with a generally cylindrical cutout 224 so as to increase the flexibility and resiliency of the mass 220 in that area. Due to the softening feature provided by the cutout 224, the vibration absorption capability of the elastomeric mass 220 is not inhibited when the mass is subjected to compressive shock loading during unusual operating conditions.

The spaced walls 202 and 208 are similarly connected by an elastomeric mass 226. The elastomeric mass 226 is generally a mirror image of the mass 220 and is similarly formed with a generally cylindrical cutout 228 in an upper surface 230 thereof.

It will be noted, that due to the arrangement of the cylindrical cutouts 228 and 224, that upwardly projecting bumper-like protuberances 232 and 234 are provided. These protuberances 232 and 234 operate in a manner similar to the operation of the bumper projections 130 and 132 associated with the vibration isolation unit shown in FIG. 3 of the drawings.

The unitized nature of the integrated bumper and vibration isolation unit shown in FIGS. 10 and 11 has proven to be especially advantageous for its relative simplicity and ease of manufacture. The upward extension of the protuberances 232 and 234 may be designed to provide a clearance between the upper surfaces thereof and an immediately adjacent surface so that the protuberances will not engage the surface unless the masses 220 and 226 are subjected to unusual stress.

Additional cutouts or recesses 236 and 238 may be formed in the elastomeric masses 220 and 226, respectively. The recesses 236 and 238 may be disposed adjacent a base portion of the projections 232 and 234 of the elastomeric masses and may be formed to extend generally parallel to the median plane 11 when installed in a chain saw machine according to the present invention. The recesses 236 and 238 operate to reduce the compressional stiffness of the projections 232 and 234 and to relieve stress when shock energy is applied to the unit which stress may tend to tear the bond of the elastomeric masses with the various walls 200, 202, 206 and 208. Additionally, the walls 200, 202, 206 and 208 may be extended and curved at 240, 242, 244 and 246. This additional length of curved wall further relieves stress and provides a larger bonding area.

FIG. 11 shows a variable thickness feature of the elastomeric masses 220 and 226 wherein the masses are necked-down in the areas indicated as 248, 250, 252 and 254 along the transverse extension of the overall integrated unit. This necking feature is especially effective in increasing the capacity of the unit for absorbing shock loading and relieves excessive stress which might tend to cause the failure of the integrity of the elastomeric masses.

ADDITIONAL INDEPENDENT FEATURES

If additional compression stiffness is desired in a mount according to FIG. 3, because of extreme heavy duty conditions, an elastomeric snubber member 300 may be disposed within the U-shaped space defined by the two walls 100 and 102 and the horizontal web portion 104 connecting the two walls 100 and 102. As shown in FIG. 12, the snubber member 300 may be secured to the assembly by means of a metallic disclike base 303 which may be embedded within the snubber member 300 to extend in a radial plane thereof. The disclike metallic base 303 of the snubber member 300 is, in turn, secured to an upper portion 304 of the threaded fastening member 107 which operates to secure the overall vibration isolation unit to the casing 6.

The snubber member 300 generally comprises a somewhat cylindrical elastomeric body which gently tapers toward the upper portion thereof when the chain saw is oriented in the upright operational posture. The body of the snubber member 300 may be formed with an axially extending bore hole 306 which is operable to lessen the stiffness of the upper portion 308 of the snubber member 300. The upper portion 308 of the snubber is in contact with the lower surface 134 of the assembly 22.

The diameter of the bore hole 306 may be approximately one-third the median diameter of the overall body of the snubber member 300 and may extend through approximately one-half the axial length thereof. Of course, the hole 306 may be sized to provide the snubber 300 with any desired stiffness operable to absorb the shock loading caused by vibration without reducing the vibration absorbing capability of the masses 118 and 124. The arrangement according to FIG. 12 has been found to be most helpful in connection with the front upper mount 44 but may be used in the rear upper mount 46 as well.

Figure 5:
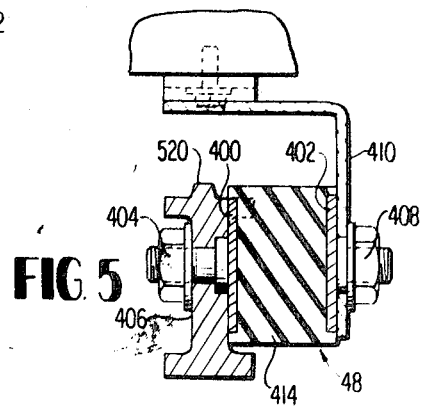
FIG. 5 is a transverse sectional view of the chain saw shown in FIG. 2 viewed along the sectional line 5—5 of FIG. 2 and illustrating the structural detail of a vibration isolation unit mounted on the underside of the chain saw and serving to connect an engine, guide bar, cutting chain and drive unit assembly with the handle network of the chain saw.

The third vibration isolation assembly 48 shown in FIGS. 5 and 8 includes wall means 400 and 402, each extending generally parallel with the plane 11.

Wall means 400 is connected by threaded fastening means 404 to one side 406 of handle leg 58. Wall means 402 is connected by threaded fastening means 408 to a bracket 410. Bracket 410, as shown in FIG. 2, is connected with under portion 412 of the housing 4 of the first assembly 2. A generally cylindrical, pluglike mass 414 of elastomeric material extends generally laterally between and is bonded to, the walls 400 and 402. Mass 414, like masses 118, 124, 144 and 146, is solid elastomeric material, not intersected by vibration absorption impeding mounting means.

As illustrated in FIG. 2, the generally longitudinal location of the third vibration isolation means 48, and the junction 70, is located within or intermediate the longitudinal extremities defined by the locations of the first and second vibration isolating units 44 and 46. Somewhat similarly, the junction between force transmitting members 60 and second assembly 22 is also located intermediate the longitudinal extremities defined by the locations of the units 44 and 46.

Referring to FIGS. 1 and 2, it can be seen that two snubber or bumper units 500 and 502 may be provided and mounted on a surface 504 of the lower handle portion 58 which is sometimes referred to as a "skid".

The member 500 is provided for preventing the lower surfaces 506 of the vibration generation unitized assembly 2 from bottoming on the surface 504 when the guide bar 14 is forcibly applied to a piece of wood to be cut. The bumper unit 500 may be similar in configuration to the snubber unit 300 shown in FIG. 12. It has been found, in several commercial embodiments of the chain saw of the present invention, that the unit 500 may not be necessary.

The bumper 502 is disposed on surface 504 of the "skid" between the mount 48 and the handle junction 70. The bumpers 500 and 502 cooperate with the vibration absorbing mount 48 in the same synergistic manner as the interaction of the integrated units 44 and 46. Bumper 502 is in minimum pressure contact with casing surface 510 and bumper 500 with surface 506.

It should be understood that any number of the bumpers or snubbers 300, 500 and 502 may be used in combination with mounts 44, 46 and 48.

A flexible or elastomeric bellows 600 may be provided to extend generally between the superposed second assembly 22 and the first vibration generating assembly 2. As indicated in FIG. 9, the lower end 602 of the bellows 600 may be connected with an inlet port 604 in the cylinder 6. An upper end 606 of the bellows 600 may be connected with a discharge end of the induction passage 36 of the carburetor 28. The bellows 600 thereby defines a central passage 608, which may be circumscribed by a flexible telescoping wall 610 and is operable to transmit a fuel and air mixture from the carburetor 28 to the air inlet port 604 in the cylinder 6. The ends 602 and 606 of the bellows 600 may be biased into fluid sealing engagement with the port 604 and a wall portion 612 of the assembly 22 adjacent the passage 36 of the carburetor 28 by an internal, helical, coiled spring 614. The bellows 600 may be located generally symmetrically with respect to the plane 11 and may be disposed longitudinally intermediate of and shielded both laterally and longitudinally by the first and second vibration isolation units 44 and 46.

Alternatively, the terminal ends 602 and 606 of the bellows may be clamped to the ducts 36 and 604 in any conventional manner.

SUMMARY OF SOME OF THE ADVANTAGES OF THE PRESENT INVENTION

It can thus be seen that an improved mounting unit has been herein provided for a chain saw vibration isolation system. The synergistic mode of operation is such that the vibration isolation and bumper portions of each unit cooperate uniquely to improve the vibration absorbing quality of the vibration isolation unit while preventing the failure thereof. It is well known that, when vibration isolation units have been deformed beyond a certain point of elasticity, the vibration absorbing quality thereof is reduced. Therefore, by providing a bumper feature within such vibration isolation units, which bumper provides soft compressive absorption of unusual shock loading due to members of a chain saw bottoming thereon, the overall vibration absorbing capability of the system is improved.

The provision of bumper members according to the present invention also operates to stabilize a saw as an operator grasps the handle portion 56 of the inertial mass assembly 22 and operates the machine by controlling a trigger type throttle control 700. Due to the action of the combined units incorporating a central snubber 300, an upper pull exerted by an operator on the handle portions 56 and 50 of the chain saw will tend to lift the entire chain saw rather than to impose separation forces on the units 44, 46 and 48 supporting the vibration generating unitized assembly 2 within the inertial mass assembly 22.

The bumper feature of the present invention permits the vibration isolation units to operate entirely within an elastic range so as to improve the vibration absorption capability of the vibration absorbing elastomeric masses which operate in shear. Since relative movement between the two principal assemblies of the chain saw many be limited to any desired degree by the present invention, metal-to-metal contact may be absolutely precluded during the normal or even unusual operation of a chain saw incorporating the present invention.

Even though the bumper feature inherently operates in compression, it should be noted that the normal operation of the overall vibration isolation units is in shear which is a more desirable mode than to be operating normally through compressional or tensional vibration absorption. However, when the strain upon the isolation units is increased, the bumper units would then become operational to absorb a major portion of the shock energy of vibration and to preclude any severely damaging effects of such unusual operation. Therefore, the combined units of the present invention provide the advantage of absorbing vibration predominantly in shear during normal operations and of safely absorbing shock loading in compression during times of increased strain.

While what has been described are the preferred and several alternative embodiments of the present invention, it should, of course, be understood that various modifications and changes may be made therein without departing from the invention. It is therefore intended to cover in the following claims all such modifications and changes as may fall within the true spirit and scope of the invention.

We claim:
1. An improved mounting unit for use in a vibration isolation system of a chain saw machine comprising:
   outer rigid wall members spaced mutually parallel;
   outwardly extending flange means projecting from a first end of each said outer rigid wall member;
   generally transversely extending web means connected between said outer rigid wall members by vibration absorbing elastomeric mass means;
   a first end of said vibration absorbing mass means being formed with protuberance means projecting in a direction generally parallel with said mutually parallel rigid wall members; and
   said protuberance means being operable to engage wall means carried by said chain saw machine and extending between said outer rigid wall members and absorb shock energy transmitted in a direction generally aligned with said mutually parallel wall members.

2. An improvement according to claim 1 wherein a rigid shroud member is mounted on each of said outer wall members and is formed to extend generally spaced from and about a periphery of said elastomeric mass means;

said transversely extending web means being formed to terminate in leg portions aligned generally parallel with said rigid outer wall members;

each said leg portion of said web means being embedded in said elastomeric mass means;

the terminal ends of each said leg portion of said transversely extending web means curving outwardly within said elastomeric mass means;

a second end of each said outer wall member curving generally inwardly thereof;

said protuberance means of said elastomeric mass means being shaped to expose projections extending in at least two diverse directions aligned generally parallel with said rigid outer wall members;

said projections of said elastomeric mass means being operable to absorb vibrations generally aligned in at least two diverse directions extending generally parallel with said rigid outer wall member;

said rigid shroud member being operable to limit the movement of said elastomeric mass means in every direction extending transversely of said rigid outer wall member;

the outwardly curving terminal ends of said transversely extending web means cooperating with said inwardly curving terminal portion of said outer wall members to compress a substantial portion of said elastomeric mass means therebetween when said terminal ends are moved together; and whereby vibrational energy is absorbed while the relative movement between said web means and said outer wall members is limited in every direction.

3. An improvement according to claim 1 wherein said protuberance means is formed with a stress relieving groove formed adjacent a base portion thereof; and the thickness of said elastomeric mass means is varied along an extension of the integrated vibration isolation and bumper unit aligned generally transversely of said parallel rigid outer wall members.

4. An improvement according to claim 1 wherein an elastomeric snubber means is mounted on said web means and disposed between said wall members to extend parallel therewith;

said snubber means extending generally co-extensively with said outer rigid wall members.

5. An improvement according to claim 3 wherein said stress relieving groove is formed to extend parallel to both said transversely extending web member and said rigid outer wall members.

6. An improvement according to claim 3 wherein:

said transversely extending web means is formed to terminate in leg portions extending parallel with said rigid outer wall members and curving inwardly at the terminal ends of said leg portions; and each said rigid outer wall member curves outwardly along a second terminal end thereof.

* * * * *